United States Patent
Snider et al.

(10) Patent No.: US 8,611,847 B2
(45) Date of Patent: Dec. 17, 2013

(54) APPARATUS AND METHOD FOR DETECTING COMMUNICATION INTERFERENCE

(75) Inventors: James Snider, Kildeer, IL (US); Robert F. D'Avello, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 997 days.

(21) Appl. No.: 12/643,068

(22) Filed: Dec. 21, 2009

(65) Prior Publication Data

US 2011/0151799 A1 Jun. 23, 2011

(51) Int. Cl.
*H04M 11/04* (2006.01)

(52) U.S. Cl.
USPC .......... 455/404.1; 455/404.2; 455/414.1; 455/67.11; 455/67.13; 455/68; 455/69; 455/556.1; 455/99; 455/456.1; 455/456.3; 340/426.1; 340/426.18; 340/426.19; 340/426.24; 340/426.26

(58) Field of Classification Search
USPC .............. 455/404.1–404.2, 410–411, 455/414.1–414.2, 521, 527, 67.11, 67.13, 455/68–69, 556.1–556.2, 557, 99, 455/456.1–456.4, 418, 420; 340/426.1, 340/426.11–426.19, 426.2–426.29, 340/426.3–426.36
See application file for complete search history.

(56) References Cited

U.S. PATENT DOCUMENTS

| | | | |
|---|---|---|---|
| 5,895,436 A * | 4/1999 | Savoie et al. | 701/468 |
| 6,330,438 B1 * | 12/2001 | McClelland et al. | 455/421 |
| 6,803,861 B2 | 10/2004 | Flick | |
| 7,091,835 B2 * | 8/2006 | Boulay et al. | 340/426.19 |
| 7,737,841 B2 * | 6/2010 | Derrick et al. | 340/539.13 |
| 7,925,740 B2 * | 4/2011 | Nath et al. | 709/224 |
| 2002/0014978 A1 | 2/2002 | Flick | |
| 2002/0163906 A1 | 11/2002 | Diachina et al. | |
| 2003/0222813 A1 | 12/2003 | Boulay et al. | |
| 2004/0005858 A1 | 1/2004 | Cervinka et al. | |
| 2004/0075539 A1 * | 4/2004 | Savoie et al. | 340/426.1 |
| 2005/0088318 A1 | 4/2005 | Liu et al. | |
| 2005/0090952 A1 * | 4/2005 | Boulay et al. | 701/33 |
| 2006/0007039 A1 | 1/2006 | Duvall | |
| 2006/0267744 A1 | 11/2006 | Baumgartner et al. | |

(Continued)

FOREIGN PATENT DOCUMENTS

DE 10009488 A1 11/2000
DE 102004048668 A1 4/2006

(Continued)

OTHER PUBLICATIONS

International Search Report dated May 24, 2011, from corresponding International Patent Application No. PCT/US2010/060518.

(Continued)

*Primary Examiner* — Tuan A Tran

(57) ABSTRACT

Location determination signals are received and a location of interest is determined from the location determination signals. A communication service is established and synchronized with a known, valid base station via a first communication channel. A value of a signal strength indicator associated with the first communication channel is monitored. When the value of the signal strength indicator falls below a threshold level, a warning message is transmitted to the known, valid base station before synchronization of the communication service is lost with the known, valid base station.

18 Claims, 3 Drawing Sheets

(56) References Cited

U.S. PATENT DOCUMENTS

| | | | |
|---|---|---|---|
| 2007/0049323 A1* | 3/2007 | Wang et al. | 455/525 |
| 2007/0079376 A1* | 4/2007 | Robert et al. | 726/23 |
| 2007/0200688 A1 | 8/2007 | Tang et al. | |
| 2008/0186932 A1* | 8/2008 | Do et al. | 370/338 |
| 2009/0036098 A1* | 2/2009 | Lee et al. | 455/411 |

FOREIGN PATENT DOCUMENTS

| | | |
|---|---|---|
| EP | 0167442 A2 | 1/1986 |
| EP | 1362753 A1 | 11/2003 |
| EP | 1514444 A1 | 3/2005 |
| EP | 1593564 A1 | 11/2005 |
| EP | 1809057 A1 | 7/2007 |
| EP | 2003818 A1 | 12/2008 |
| EP | 2124428 A1 | 11/2009 |
| GB | 229684321 A | 7/1996 |
| GB | 2317418 A | 3/1998 |
| GB | 2407455 A | 4/2005 |
| GB | 2435987 A | 9/2007 |
| GB | 2445046 A | 6/2008 |
| GB | 2457102 A | 8/2009 |
| WO | 95/33214 A1 | 12/1995 |
| WO | 96/04155 A1 | 2/1996 |
| WO | 00/21053 A1 | 4/2000 |
| WO | 01/32481 A1 | 5/2001 |
| WO | WO01/31797 A1 | 5/2001 |
| WO | 03/103322 A1 | 12/2003 |
| WO | 2005/112321 A1 | 11/2005 |
| WO | 2006/092737 A2 | 9/2006 |
| WO | 2007/019814 A1 | 2/2007 |
| WO | 2008/111001 A2 | 9/2008 |

OTHER PUBLICATIONS

International Search Report dated Jun. 1, 2011, from corresponding International Patent Application No. PCT/US2010/060723.
International Search Report dated Mar. 28, 2011, from corresponding International Patent Application No. PCT/US2010/060803.
International Search Report dated Apr. 15, 2011, from corresponding International Patent Application No. PCT/US2010/060773.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated Mar. 10, 2011, from corresponding International Patent Application No. PCT/US2010/060811.
International Search Report dated Mar. 1, 2011, from corresponding International Patent Application No. PCT/US2010/060750.
International Search Report dated Feb. 28, 2011, from corresponding International Patent Application No. PCT/US2010/060532.
International Search Report dated Mar. 1, 2011, from corresponding International Patent Application No. PCT/US2010/060527.
International Search Report dated May 13, 2011 from corresponding International Patent Application No. PCT/US2010/060675.
International Search Report dated Jun. 28, 2011, from corresponding International Patent Application No. PCT/US2010/060795.
International Search Report dated Jun. 17, 2011, from corresponding International Patent Application No. PCT/US2010/060787.

* cited by examiner

APPARATUS AND METHOD FOR DETECTING COMMUNICATION INTERFERENCE

CROSS REFERENCES TO RELATED APPLICATIONS

"Apparatus and Method of Detecting Jamming of Communications" having Ser. No. 12/643,049
"Apparatus and Method for Broadcasting the Detection of RF Jammer Presence" Ser. No. 12/643,825
"Apparatus and Method for Compromised Vehicle Tracking" having Ser. No. 12/643,498
Apparatus and Method for Detecting a Cloned Base Station" having Ser. No. 12/643,081
"Apparatus and Method for Detecting a Cloned Base Station" having Ser. No. 12/643,353
"Apparatus and Method for Determining an Invalid Base Station" having Ser. No. 12/643,463
"Apparatus and Method for Determining Vehicle Location" having Ser. No. 12/643,412
"Apparatus and Method for Maintaining Communication with a Stolen Vehicle Tracking Device" having Ser. No. 12/643,841
"Apparatus and Method for Reducing False Alarms in Stolen Vehicle Tracking" having Ser. No. 12/643,889
"Apparatus and Method for Tracking Stolen Vehicles" having Ser. No. 12/643,862
"Apparatus and Method for Maintaining Communications with a Vehicle in the Presence of Jamming" having Ser. No. 12/643,850
all of which are being filed on the same date as the present application and all of which having their contents incorporated herein by reference in their entireties.

FIELD OF THE INVENTION

The field of the invention relates to communications between various entities and, more specifically to detecting the jamming/interference or attempted jamming/interference of these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. In other examples, some criminals have covered vehicles with Radio Frequency (RF) shields (e.g., blanket-like coverings that block RF communications to or from a vehicle). Previous attempts at detecting such jamming/interference and/or attempted jamming/interference and reporting these actions to a security center have generally been unsuccessful and/or expensive to accomplish.

Figure 1:
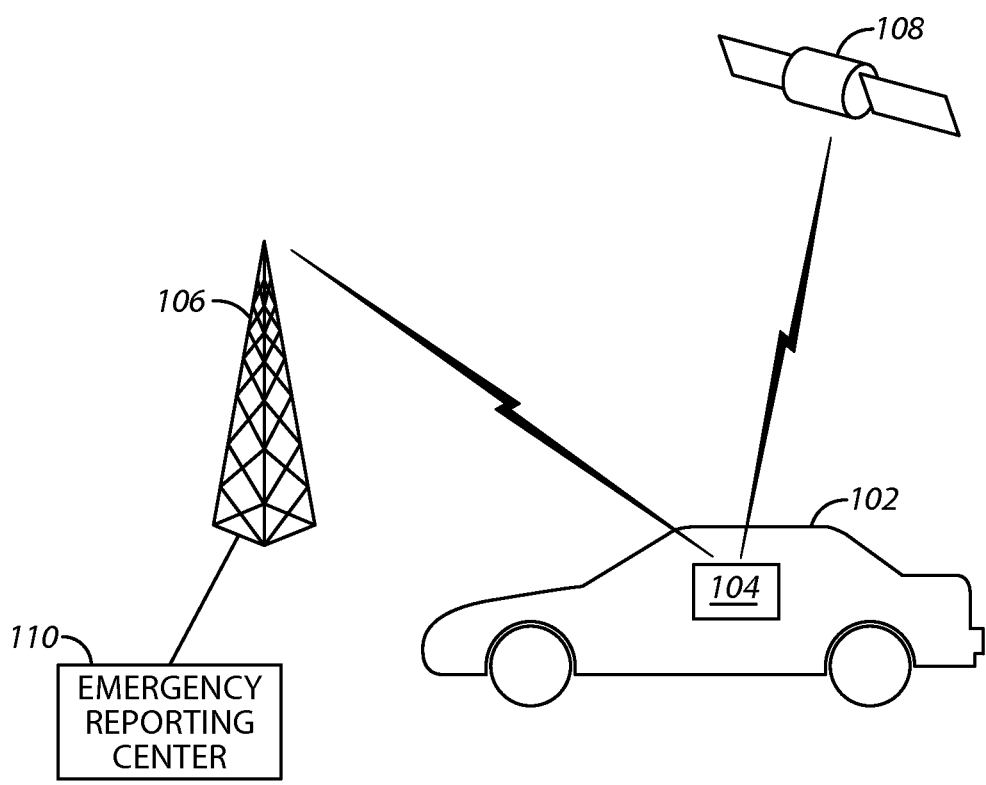
FIG. 1 comprises a block diagram of a system that detects the jamming and/or attempted jamming of communications according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where the jamming or attempted jamming of communications (e.g., vehicular communications) can be detected easily and any instances of the jamming and/or attempted jamming communicated to an emergency reporting system or center and/or other authorized person or persons so that appropriate action can be taken to protect the vehicle or the contents of the vehicle and prevent the occurrence of a crime. To take one example, the approaches described herein detect the presence of an RF shield and do so accurately without producing a false alarm (that might be initiated, for example, by the vehicle being parked next to a truck). The approaches described herein are easy to use, accurate in determining the occurrence of a jamming or attempted jamming, and cost effective to implement resulting in enhanced security for vehicles and their contents.

In many of these embodiments, location determination signals are received and a location of interest is determined from the location determination signals after, for example, a vehicle is parked. Communication service is established and synchronized with a known, valid base station via a first communication channel. A value of a signal strength indicator associated with the first communication channel is monitored. When the value of the signal strength indicator falls below a threshold level, a warning message is transmitted to the known, valid base station before synchronization of the communication service is lost with the known, valid base station. In some examples, these actions may be performed by a device that is disposed at or within a vehicle.

The signal strength indicator may fluctuate in a number of different ways. In one example, the signal strength indicator falls to the threshold level in a substantially step-wise manner. In other examples, the received signal strength falls according to a smooth curve. In some examples, the signal strength indicator is taken to be an average of a plurality of signal strength measurements. In other examples, the signal strength indicator is the measured instantaneous value of signal strength at a given instant in time.

In some of these examples, the warning message is transmitted over the first communication channel. In other aspects, the warning message is transmitted to the base station over a second communication channel and the second communication channel is different than the first communication channel. Other examples and approaches of transmitting the warning message are possible.

In others of these embodiments, the warning message is forwarded to an emergency reporting system and assistance is sent to the location of interest after receiving the warning message at the emergency reporting system or user. As used herein, the expression "emergency reporting system" will be understood to be a party authorized or charged to protect the vehicle (such as an off-site alarm center or the police), and so forth. The warning message may also be transmitted to the user (e.g., the owner or operator of the vehicle).

In some of these examples, the location determination signals are transmitted from a satellite. To take one example, a Global Positioning Satellite (GPS) may be used. In other aspects, the warning message includes the location of interest. For example, the coordinates of the vehicle may be included and this information may be useful in aiding personnel dispatched by the emergency reporting system in response to the warning message. Other examples of information may also be included. The warning messages may be according to any format or protocol.

In other examples, an audible alarm may be issued to the user. For example, an alarm may be displayed or activated on the owner's cellular phone. The alarm may also include visual indicators (e.g., lights or light emitting diodes (LEDs)). In other aspects, an alarm may be activated at the vehicle. This alarm may be audio (e.g., a siren) or visual (e.g., flashing lights) or both. In this way, those that are attempting to enter the vehicle may be dissuaded from doing so.

In others of these embodiments, a device for detecting the attempted interference with communications between a user and an emergency reporting system includes an interface and a controller. The interface includes an input and an output and the input configured to receive location determination signals. The controller is coupled to the interface and is configured to establish and synchronize a communication service with a known, valid base station via a first communication channel established with the base station at the output of the interface. The controller is further configured to monitor a value of a signal strength indicator associated with the first communication channel received at the input of the interface. The controller is still further configured to, when the value of the signal strength indicator falls below a threshold level, transmit a warning message to the known, valid base station at the output of the interface before synchronization of the communication service is lost with the known, valid base station.

In some examples, the warning message is transmitted over the first communication channel. In other aspects, the warning message is transmitted to the base station over a second communication channel and the second communication channel is different than the first communication channel.

In other examples, an alarm indicator is used and the controller is further configured to issue an audible alarm upon the transmission of the warning message. The alarm can be made to the user (wherever the user is located) or at the vehicle (to attempt to dissuade those who may be attempting to break in to the vehicle from doing so).

Referring now to FIG. 1, one example of a system for detecting the jamming/interference or attempted jamming/interference of vehicular communications is described. A vehicle 102 includes a communication and jamming/interference detection device 104. The communication and jamming/interference detection device 104 is disposed anywhere in or at the vehicle and communicates with a base station 106 and an external navigation system 108.

The communication and jamming/interference detection device 104 may be, in one example, a programmed electronic device that determines the location of the vehicle 102 from signals received from the navigation system 108 and determines if jamming and/or attempted jamming is occurring as to signals being received and/or being transmitted. Alternatively, a separate device (i.e., disposed within a separate housing structure) may be used to determine the location of the vehicle and this separate device may communicate with the communication and jamming/interference detection device 104. The external navigation system 108 may be a GPS satellite or satellite system, in one example.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The communication device 104 is any type of communication device that communicates with entities outside the vehicle 102 using any type of communication technology or protocol. For example, the communication device 104 may be or may incorporate a cellular phone, transponder, radio, or some combination of these or other devices.

The base station 106 is any type of base station as known to those skilled in the art. In this respect it may be a cellular base station such as Model KRC 131 1002/2 R5F manufactured by Ericsson. Other examples of base stations are possible. In others of these examples, the base station 106 is a valid base station and communications are established (or are attempted to be established) with the device 104.

In one example of the operation of the system of FIG. 1, communication service is established and synchronized between the communication device 104 and a known, valid base station 106 via a first communication channel. The service is established with the device 104 being in service and registered on the network.

The value of a signal strength indicator associated with the first communication channel is monitored. For example, the Rx Level value is monitored. When the value of the signal strength indicator falls below a threshold level, a warning message is transmitted to the known, valid base station before synchronization of the communication service is lost with the known, valid base station 106. Since the signal strength value should remain constant or nearly constant (e.g., vary less than 6 dB with the vehicle parked in one example), the approaches described herein advantageously detect the use of RF shields or other devices/covers that block vehicular communications.

The base station 106 may communicate with a emergency reporting system, the police, or a user according to any known technology or communication protocol. Alternatively, the warnings may be communicated directly to any or all of these entities directly without using the base station 106 as an intermediary.

The signal strength indicator may fluctuate in a number of different ways. In one example, the signal strength indicator may fall to the threshold level in a substantially step-wise manner. In other examples, the decline is in the form of a smooth curve. In some examples, the signal strength indicator is taken to be an average of a plurality of signal strength measurements. This approach has one advantage of tending to filter out natural blockages of the signal from the base station 106 to the device 104 that could set off a false alarm. In other examples, an instantaneous value of the received signal is monitored and used.

The threshold can be set to an appropriate level to trigger the warning. By "appropriate" level, what is meant is a level appropriate for the state of the vehicle (e.g., parked or moving) or the vehicle's environment. Setting the threshold to an appropriate level avoids false reports. For example, the signal strength level may decrease naturally due to a natural blockage of a Radio Frequency (RF) signal path from the base station 106 to the device 104 such as when a large truck blocks the signal.

Various actions can be taken once jamming is detected. As mentioned, a warning message can be transmitted to an emergency reporting center 110. The emergency reporting center 110 is coupled to the base station 106. For example, this warning message may be transmitted over a GSM network. In other examples, other frequencies and/or other types of networks in addition to or instead of the GSM network can be used to transmit the warning message (and/or transmit or receive other communications). For example, warning messages may be transmitted at FM Radio Data System (RDS) frequencies, over Wireless Local Area Networks such as Wi-Fi networks, over infrared (IR) networks, Bluetooth networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/iDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be activated once jamming is detected. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a schema validation tool (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming is detected various actions can be taken that affect the operation of the vehicle and/or a driver's ability to successfully drive the vehicle 102. In these examples, it is assumed that the detection of jamming denotes an attempt to steal by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In some examples, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels jamming is determined to be occurring. The threshold can be based upon map data provided by a system or device that is disposed external to the communication device 104 and/or developed by the device 104 from previous readings (e.g., previous drives) to name two approaches.

In other aspects, the location of the vehicle 102 can be tracked even as jamming is occurring. For instance, Rx Level and/or Rx Qual readings (e.g., reported by one or more communication devices to an external service center) may be used to identify and/or confirm jammer presence. Triangulation approaches may be used to identify a rough location of the jammer, e.g., the jammer is in the vicinity of the unit(s) reporting an issue.

In some aspects, the communication device may authenticate the base station 106. For example, various hand-shaking approaches may be used by the communication device to authenticate the base station 106.

Figure 2:
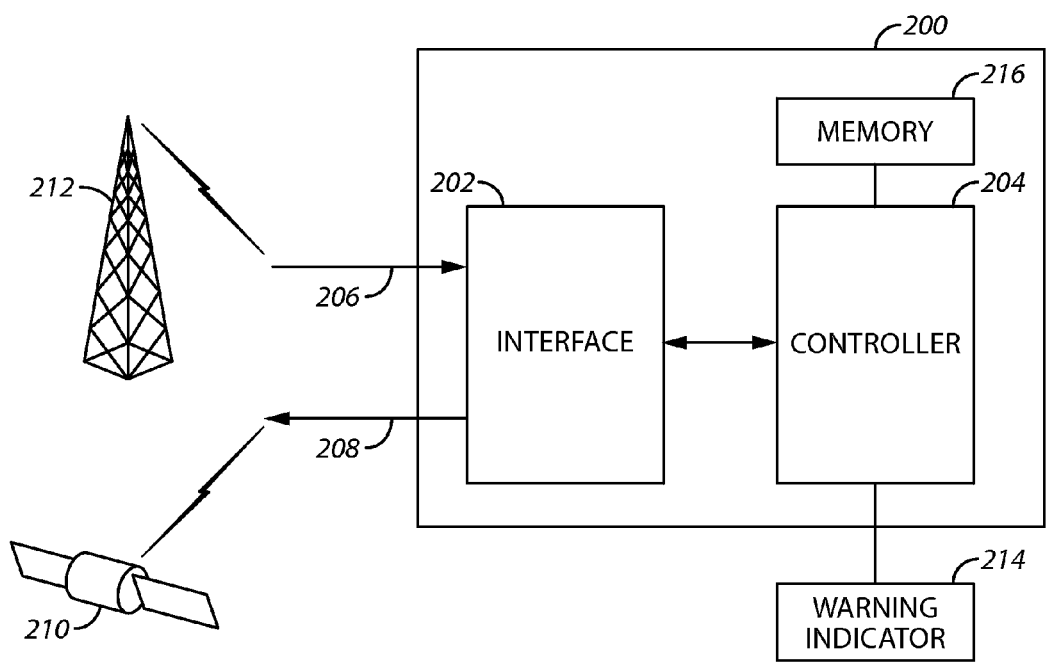
FIG. 2 comprises a block diagram of an apparatus that detects the jamming and/or attempted jamming of communications according to various embodiments of the present invention.

Referring now to FIG. 2, one example of a device for detecting the jamming of communications between a user and an emergency reporting system is described (e.g., device 104 of FIG. 1). The device 200 includes an interface 202 and a controller 204. The interface 202 includes an input 206 and an output 208. The output transmits signals to a valid base station 212 (e.g., at cellular frequencies) and the input 206 is configured to receive location determination signals from an external source 210 (at satellite frequencies). For example, these signals may be received from a GPS satellite or GPS satellite system. Other examples of systems and types of signals are possible. The device 200 (and, more specifically, the controller 204) may calculate its position from the received location determination signals, for example, those received from a GPS satellite. The device 200 may have a memory 216 that stores computer instructions to perform any of the approaches described herein.

The interface 202 includes any analog or digital circuitry and any programmed processing arrangements required to send, receive, and/or process these signals. For instance, the interface 202 may include various antennas, processors, and conversion circuitry to transmit and receive cellular and satellite communications.

The controller 204 is coupled to the interface 202 and is configured to monitor a value of a signal strength indicator associated with the first communication channel received at the input of the interface. The controller 204 is further configured to, when the value of the signal strength indicator falls below a threshold level, transmit a warning message to the known, valid base station 212 at the output of the interface before synchronization of the communication service is lost with the known, valid base station 212. The interface 202 may use the same or different antennas to communicate with the external source 210 and the base station 212. Bidirectional communications may also be conducted between the device 200 and the base station 212 and/or the external source 210. For each of the base station 212 and external source 210 and if bidirectional communications are conducted, separate antennas may be used at the device 200.

An optional warning indicator 214 may also be used. This indicator 214 may be an audible indicator (e.g., a siren) or a visual indicator (e.g., flashing lights) or combinations of these elements. In addition, the controller 204 can send appropriate messages directly to the user to alert the user that an attempt at breaking into their vehicle may be occurring. The warning messages may include the coordinates from the vehicle as determined from the received location determination signals. This may be accomplished by any know communication technology or protocols such as to the cellular phone of the user using appropriate cellular phone technology.

Figure 3:
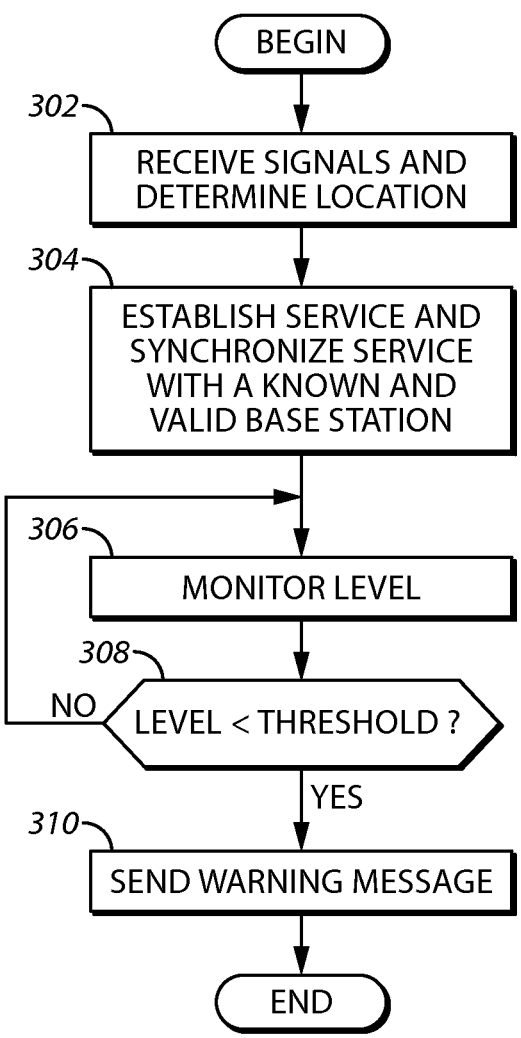
FIG. 3 comprises a flowchart of one example of an approach for detecting the jamming and/or attempted jamming of between a user and an emergency reporting system according to various embodiments of the present invention.

Referring now to FIG. 3, one example of an approach for preventing the jamming of vehicular communications is described. In one example, these approaches may be used after a vehicle is parked. The determination as to whether a vehicle has been parked may include sensing whether the ignition is activated and/or the brakes set, to mention a few examples. At step 302, location determination signals are received and a location of interest is determined from the location determination signals. The signals may be received at a vehicle or at some other location. In one example, these systems may be in the format used by GPS satellites.

At step 304, a communication service is established and synchronized with a known, valid base station via a first communication channel. In this example, the mobile unit registers and establishes service with the base station.

At step 306, the value of a signal strength indicator associated with the first communication channel is monitored. For example, a Rx Level value as used in cellular communication systems may be monitored. Other examples are possible.

At step 308, it is determined whether the value of the signal strength indicator falls below a threshold level. For example, an appropriate threshold may be established (e.g., Rx Level decreases by 6).

If the answer is affirmative, at step 310 a warning message is transmitted to the known, valid base station before synchronization of the communication service is lost with the known, valid base station. The base station may further communicate with (and send warning messages to) an emergency reporting system or center, the police, and/or a user. If the answer at step 308 is negative, control returns to step 306 as described above.

Thus, approaches are provided where the jamming/interference or attempted jamming/interference of communications (e.g., vehicular communications) can be detected easily and any instances of the jamming/interference and/or attempted jamming/interference communicated to an emergency reporting system or center and/or other authorized person or persons so that appropriate action can be taken to protect the vehicle or the contents of the vehicle and prevent the occurrence of a crime. To take one example and in the case where the vehicle is actually stolen, the approaches described herein detect jamming/interference of a stolen vehicle tracking (SVT) system disposed within the vehicle. The approaches described herein are easy to use, accurate in determining the occurrence of a jamming/interference or attempted jamming/interference, and cost effective to implement resulting in enhanced security for vehicles and their contents.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of detecting an attempt at interfering with communications between a vehicle and an emergency reporting system comprising:

receiving location determination signals at a vehicle and determining a location of the vehicle from the location determination signals;

establishing a first communication with a known, valid cellular base station via a first cellular communication channel;

monitoring a value of a signal strength indicator associated with the first cellular communication channel;

when the value of the signal strength indicator falls below a predetermined threshold level, transmitting a first warning message via a Radio Data System (RDS) frequency, the first warning message being configured to be received by car radios in the vicinity of the vehicle and configured to be capable of being displayed on displays of said car radios in said vicinity.

2. The method of claim 1 wherein the first warning message comprises information identifying the vehicle and a notice that the vehicle is stolen.

3. The method of claim 2, additionally comprising the step of sending a second warning message to an emergency reporting system via the first cellular communications channel when the value of the signal strength indicator falls below the predetermined threshold level, the second warning message comprising a location of the vehicle.

4. The method of claim 3, further comprising forwarding the second warning message to an emergency reporting system.

5. The method of claim 3, wherein the warning message includes the location of the vehicle.

6. The method of claim 1 wherein the location determination signals are received from a satellite.

7. The method of claim 1 further comprising issuing an audible alarm.

8. A non-transitory computer usable medium having a computer readable program code embodied therein, said computer readable program code adapted to be executed to implement a method of detecting an attempt at interfering with communications between a vehicle and an emergency reporting system, the method comprising:

receiving location determination signals at the vehicle and determining a location of the vehicle from the location determination signals;

establishing a cellular communication with a known, valid base station via a first cellular communication channel;

monitoring a value of a signal strength indicator associated with the first cellular communication channel;

determining that the cellular communication with the vehicle is being jammed when the value of the signal strength indicator falls below a threshold level, and thereafter, transmitting a first warning message from the vehicle via a Radio Data System (RDS) frequency, the first warning message being configured to be received by car radios in the vicinity of the vehicle and additionally configured to be capable of being displayed on displays of said car radios in said vicinity.

9. The non-transitory computer usable medium of claim 8 wherein the first warning message comprises an identification of the vehicle and a notice that the vehicle is being stolen.

10. The non-transitory computer usable medium of claim 8 wherein the method additionally comprises: transmitting a second warning message via the cellular communication channel.

11. The non-transitory computer usable medium of claim 10 further comprising forwarding the second warning message to an emergency reporting system via the cellular communication channel.

12. The non-transitory computer usable medium of claim 8 wherein the location determination signals are received from a satellite.

13. The non-transitory computer usable medium of claim 8 wherein the warning message includes the location of the vehicle.

14. The non-transitory computer usable medium of claim 8 further comprising issuing an audible alarm at the vehicle.

15. A device for detecting attempted interference with communications between a vehicle and an emergency reporting system comprising:

an interface with an input and an output, the input configured to receive location determination signals;

a controller coupled to the interface, the controller configured to establish a cellular communication with a known, valid base station via a cellular communication channel, the controller further configured to monitor a value of a signal strength indicator associated with the cellular communication channel, controller further configured to, cause the transmission of a first warning message on a Radio Data System (RDS) frequency, the first warning message being configured to be received by car radios in the vicinity of the vehicle and additionally configured to be capable of being displayed on displays of said car radios in said vicinity, the first warning message being transmitted when the value of the signal strength indicator falls below a threshold level.

16. The device of claim 15 wherein the first warning message comprises an identification of the vehicle and a notice that the vehicle is being stolen.

17. The device of claim 15 wherein the controller is additionally configured to transmit a second warning message to a base station for the cellular communication channel.

18. The device of claim 15 further comprising an alarm indicator and wherein the controller is further configured to issue an audible alarm upon the transmission of the warning message.

* * * * *